United States Patent Office 3,657,161
Patented Apr. 18, 1972

3,657,161
POLYCARBODIIMIDE-POLYISOCYANURATE FOAM
David L. Bernard and Anthony J. Doheny, Jr., Pittsburgh, Pa., assignors to Baychem Corporation, New York, N.Y.
No Drawing. Filed Oct. 31, 1967, Ser. No. 679,549
Int. Cl. C08g 22/46, 22/34
U.S. Cl. 260—2.5 AW                          8 Claims

ABSTRACT OF THE DISCLOSURE

Polycarbodiimide polyisocyanurate foams which have improved resistance to burning and which are useful as plastic foam building insulation. From about 3 to about 45% of the total carbodiimide and isocyanurate groups in the foam plastic are preferably carbodiimide groups. The foams are prepared by polymerizing an isocyanate in the presence of a blowing agent, a catalyst which promotes the formation of carbodiimide groups and a catalyst which promotes the formation of isocyanurate groups.

---

The present invention relates to the preparation of plastic foams and more particularly to the preparation of polyisocyanurate foams. The foams of this invention are particularly useful as foam plastic building insulation materials and have particularly good resistance to burning and flame propagation.

It has been proposed hertofore to prepare polyisocyanurate foams such as those disclosed, for example, in Belgium Patent 680,380 and in British Patent 908,337. These foams have poor resistance to burning. After a short time in intense heat these foams explode and burst into fragments like a pine or cedar log in a campfire.

It is also known to prepare carbodiimide foams according to Belgium Patent 657,835, however, when these foams are burned they tend to flow and the flowing, burning organic material produces a high degree of flame-spread which is also undesirable.

It is therefore an object of this invention to provide plastic foams which have improved resistance to burning, i.e. improved resistance to flame propagation and flame spread. It is another object of this invention to provide foams which are useful as building insulation materials. A further object of this invention is to provide foams which have high softening points and high solvent resistance so they can be used as building materials. Still a further object of this invention is to provide foams which are of relatively low density and which have incorporated therein an inert gas which further improves their insulating properties. Still another object of this invention is to provide plastic foams which have little tendency to adsorb water so that the foam can be used in the production of refrigerated trucks, railroad cars and the like. Still another object of this invention is to provide a process for the preparation of foam plastics which contain both isocyanurate and carbodiimide groups.

The foregoing objects and others which will become apparent from the following description are accomplished, generally speaking, by providing polyisocyanurate-polycarbodiimide foams. Thus, in accordance with this invention foams are prepared from organic polyisocyanates through formation of both isocyanurate and carbodiimide groups in the presence of either a chemically reactive or chemically inert blowing agent. It is preferred in accordance with the invention that from 3% to 45% of the total carbodiimide and isocyanurate linkages be of the carbdoiimide type. It is an essential feature of this invention that two types of catalysts are used in the preparation of the foams, i.e. a catalyst which promotes the formation of isocyanurate groups and one which promotes the formation of carbodiimide groups. It is not absolutely necessary that the catalysts be present in the reaction mixture at the same time. In other words, one may prepare the carbodiimide first and then proceed with the preparation of the isocyanurate, or the reaction may proceed simultaneously. It is best to either bring about all of the carbodiimide formation first and then form the isocyanurate or to carry out the carbodiimide formation simultaneously with the isocyanurate formation. It is undesirable to have too much isocyanurate formation prior to some carbodiimide formation. The carbodiimide structure is thermally and chemically stable and does not detract from the thermal stability of the foam as does the incorporation of urethane groups or the addition of inert plasticizers to isocyanurate foam.

Any suitable organic polyisocyanate may be used for the preparation of the polycarbodiimide-polyisocyanurate foams of this invention, but it is preferred to use aromatic polyisocyanates and it is most preferred to use a mixture of aromatic polyisocyanates. Where mixtures are used, some of the mixture is an aromatic diisocyanate and some of the mixture is an aromatic tri- or higher polyisocyanate so that the mixture of isocyanates preferably has an average functionality of from about 2.1 to about 4. Suitable organic polyisocyanates therefore include 1,4-butane diisocyanate, 1,10-decane diisocyanate, cycloaliphatic polyisocyanates such as 1,4-cyclohexane diisocyanate, 1-methyl-2,4-cyclohexane diisocyanate, 1 - methyl-2,6-cyclohexane diisocyanate and especially mixtures of these two as disclosed for example in Canadian Patent 745,636, bis-(4-isocyanato)-cyclohexyl methane and aromatic polyisocyanates such as 2,4-toluylene diisocyanate, 2,6-toluylene diisocyanate, 4,4' - diphenylmethane diisocyanate, 1,5-naphthalene diisocyanate, 2,2'-dimethyl-4,4'-diisocyanato diphenylmethane, 2,2' - dimethoxy-4,4'-diisocyanato diphenylmethane as well as halogenated aromatic polyisocyanates such as, for example, 2,2'-dichloro-4,4'-diisocyanato diphenylmethane, perchlorodiphenylmethane diisocyanate, trichlorotoluene diisocyanate such as 1-methyl-2,4-diisocyanato, 3,5,6 - trichlorotoluylene diisocyanate as well as the corresponding brominated isocyanates such as, for example, 2,2'-dibromo-4,4'-diisocyanato diphenylmethane and the like. It is preferred to use a mixture of isocyanates represented by the formula

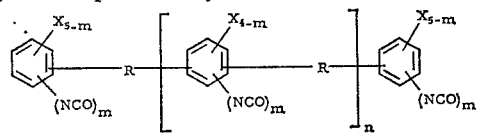

$m = 1–3$
$n = 0.5–2.0$
X=hydrogen, lower alkyl, lower alkoxy, halogen, nitro
R=alkylene It is preferred that the alkylene radicals in said isocyanate have from 1 to 6 carbon atoms and R is most preferably methylene, $m$ is most preferably 1 and X is most preferably hydrogen so that the isocyanate can be made by phosgenating the mixture of amines prepared from aniline and formaldehyde. It is preferred that $n$ is such a value that there are from about 30 to about 60 percent diisocyanates present in the initial mixture of polyaryl polyalkylene polyisocyanates. Polyaryl polyalkylene polyisocyanates of this type may be prepared by reacting an aromatic amine with an aldehyde or a ketone and then phosgenating the resulting amine as disclosed, for example, in U.S. Pat. 2,683,730 and Canadian Pat. 665,495. For this purpose any suitable aryl amine preferably having one benzene nucleus and at least one replaceable hydrogen atom is contemplated. It is preferred that the benzene nucleus be substituted by not more than one radical or other substituent, such as, chlorine, bromine, nitro and the like, and that it have one or two free primary amino groups. When the benzene nucleus is substituted by a radical, it is preferably a lower alkyl radical, such as, methyl, ethyl, propyl and the like. Aniline is the preferred amine. However, other amines are within the scope of the invention including, for example, chloroaniline, bromoaniline, ortho, meta and paratoluidine, ortho, meta, and parazylidine, ortho, meta and paraxenyl amines, methoxyaniline, nitroaniline, 2,4-toluylene diamine, 2,6-toluylene diamine and the like. These amines demonstrate the radicals X which can be used in the foregoing formula, i.e. lower alkyl-methyl, etc., lower alkoxy-methoxy, halogen-chloro-, bromo- and the like.

Any suitable aldehyde or ketone may be used in the preparation of the amine for phosgenation. It is preferred that the aldehyde or ketone have less than 7 carbon atoms including, for example, formaldehyde, acetaldehyde, propionaldehyde, butyraldehyde, benzaldehyde, cyclohexanealdehyde, acetone, methyl ethyl ketone, methyl-n-propyl ketone, diethyl ketone, hexanone-2, hexanone-3, di-n-propyl ketone, cyclohexanone and the like. It is preferred that the aldehyde or ketone have the formula RCOR wherein R is hydrogen or alkyl, the sum of the carbon atoms being at most 6. Where the carbonyl group is removed from the aldehyde or ketone, these demonstrate the radicals, R in the foregoing formula for the mixture of isocyanates such as methylene from formaldehyde and so forth.

The mixture of organic polyisocyanates of the foregoing formula are prepared by reacting phosgene with the resulting mixture of amines preferably at a temperature of from about $-10°$ C. to about $80°$ C. in a first step to prepare a mixture of carbamyl chlorides and amine hydrochlorides and then at a higher temperature and with additional phosgene in a second step to prepare the corresponding isocyanates. The phosgenation is preferably carried out in an inert organic solvent such as orthodichlorobenzene, toluene, the diethyl ether of diethylene glycol or any other suitable solvent for example, those disclosed in U.S. Pat. 2,683,730. The phosgenation procedure of this patent is also satisfactory.

A particularly preferred mixture of polyisocyanates is one having the formula

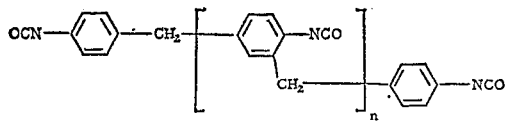

wherein $n$ has an average value of 0.88. This mixture contains 50% diisocyanate and about 21% triisocyanate, the balance being tetra and pentaisocyanate sufficient to give $n$ a value of 0.88. It is also possible to use a mixture of the polyaryl polyalkylene polyisocyanates with additional organic diisocyanate such as, for example, toluene diisocyanate. A suitable mixture of this type has from 10 to 90% toluene diisocyanate and the balance a polyaryl polyalkylene polyisocyanate of the type disclosed above. The mixture preferably contains at least about 50% by weight of the polyaryl polyalkylene polyisocyanate and preferably a polyphenyl polymethylene polyisocyanate which may or may not have been halogenated.

The foams of the invention are prepared by polymerizing an isocyanate in the presence of a catalyst for the formation of isocyanurate groups from isocyanate groups and a catalyst for the formation of carbodimide groups from isocyanate groups. The process may be carried out by combining the isocyanate, a blowing agent and both types of catalyst simultaneously in a machine mixer, for example of the type described in U.S. Reissue Pat. 24,514. Alternately, the foams may be prepared by mixing the organic polyisocyanate with the catalyst which promotes the formation of carbodiimide groups in a first step and then mixing the resulting prepolymer in a second step with a blowing agent and a catalyst which promotes the formation of isocyanurate groups. When the carbodiimide formation is carried out in a first step it is preferred that the reaction not proceed beyond a point where the viscosity of the reaction mixture is 1000 centipoises at 25° C.

Any suitable catalyst for the formation of isocyanurate groups may be used. The preferred catalysts are those which will cause gelation of the isocyanate to form an isocyanurate at a temperature of 20° C. in 10 minutes when mixed in an amount of 1 to 10 grams of the catalyst per 100 grams of the organic polyisocyanate. Catalysts which meet these conditions include sodium phenate, sodium trichlorophenate, 2,4,6 - tri-(dimethylaminomethyl)-phenol, a mixture of 80% ortho and 20% para dimethylaminomethyl phenol and the like. It is also possible to use other catalysts which will cause the formation of isocyanurates at temperatures above 20° C. but if these catalysts are used it is necessary to suffer the disadvantage of using a higher temperature and pressure or a blowing agent which will not expand until the higher temperature is reached. The catalysts which may be used at the higher temperatures include those set forth above as well as lead naphthenate, potassium oleate, lead benzoate, lead octoate and the like.

Any suitable catalyst for the formation of carbodiimide groups may be used, however, it is preferred to use those catalysts which will cause the formation of carbodiimide groups at 30° C. or less. Suitable catalysts of this type include phospholines, phospholine oxides and sulfides, phospholidines and phospholidine oxides and sulfides. The phospholine oxides and sulfides are described in U.S. Patents 2,663,737 and 2,663,738. The phospholidine oxides are described in U.S. Patent 2,663,739. The corresponding phospholines and phospholidines may be prepared by a lithium aluminum hydride reduction of the corresponding dichloro phospholine or phospholidine. These dichloro compounds are also used to prepare the above mentioned oxides and sulfides and are described in U.S. Patent 2,663,736. Representative phospholines include 1-phenyl-3-phospholine,
3-methyl-1-phenyl-3-phospholine,
1-ethyl-3-phospholine,
3-isopropyl-1-phenyl-3-phospholine and
3-(4-methyl-3-pentenyl)-1-phenyl-3-phospholine.

Of the phospholine oxides and sulfides which may be used, the following may be mentioned:

3-methyl-1-phenyl-3-phospholine 1-oxide,
1-ethyl-3-methyl-3-phospholine 1-oxide,
1-ethylphenyl-3-methyl-3-phospholine 1-oxide,
3-(4-methyl-3-pentenyl)-1-phenyl-3-phospholine 1-oxide,
3-chloro-1-phenyl-3-phospholine 1-oxide,
1,3-diphenyl-3-phospholine 1-oxide,
1-ethyl-3-methyl-3-phospholine 1-sulfide,
1-phenyl-3-phospholine 1-sulfide and
2-phenylisophosphindoline 2-oxide.

Representative phospholidines include 1-phenylphospholidine,
3-methyl-1-phenylphospholidine,
1-ethyl-3-methylphospholidine and
1-ethylphospholidine.

Suitable phospholidine oxides include 1-ethyl-3-methylphospholidine 1-oxide and 1-phenylphospholidine 1-oxide. Thus, the catalysts preferably have the formula

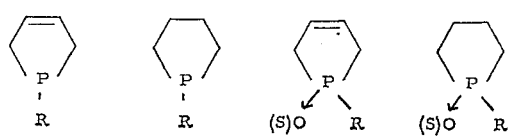

In the foregoing formula R may be any suitable alkyl, aryl, alkaryl or heterocyclic radical as is amply demonstrated by the examples set forth above.

Any suitable emulsifier or stabilizing agent may be used in the preparation of the isocyanurate foams of this invention including, for example, sulfonated castor oil or the like, but it is preferred to use a foam stabilizer which is based on silicone such as, for example, a polydimethyl siloxane or a polyoxyalkylene block copolymer of a silane. The latter type of silicone oil is disclosed in U.S. Patent 2,834,748. Specific examples include

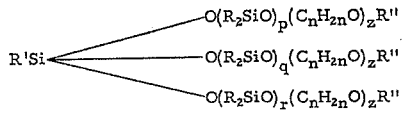

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

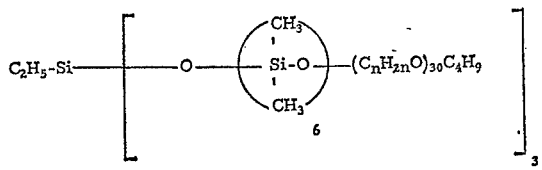

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537; 668,478 and 670,091. Other suitable compounds may therefore have the formula $$(R')(SiO_3)_x(R_2SiO)_y[(C_nH_{2n}O)_zH]_a[R''']_{3x-a}$$

wherein $x$ is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonylsilyl radical having the formula R₃Si— where R is monovalent hydrocarbon radical and terminates a siloxane chain, and R' represents a monovalent or polyvalent hydrocarbon radical, being monovalent when $x$ is 1, divalent when $x$ is 2, trivalent when $x$ is 3; tetravalent when $x$ is 4.

One type of block copolymer is represented when $x$ in the abvoe formula is one, and in this instance a branched chain formula may be postulated as follows:

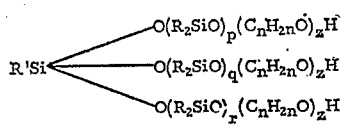

where $p+q+r$ has a minimum value of 3, the other subscripts being the same as in the immediately foregoing formula. In this instance, all three of the oxyalkylene chains are joined to the end of polysiloxane chains of the type —(R₂SiO)—. Specifically, one could use

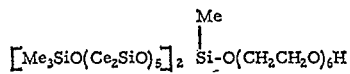

As pointed out above it is essential that the blowing agent be of the inert type, such as, for example, low boiling hydrocarbon such as pentane, hexane, heptane, pentene, heptene, benzene and the like, azo compounds such as azohexahydro benzodinitril and the like, halogeneated hydrocarbons such as dichlorodifluoromethane, dichlorodifluoroethane, trichlorofluoromethane, isopropyl chloride, methylene chloride and the like and acetone.

These foams are the best foam plastic building insulation materials discovered so far. They exhibit vastly reduced brittleness compared to foams based entirely on isocyanurate formation. They have high softening points and high solvent resistance compared to foams based entirely on carbondiimide formation. The burning characteristics of either foams based entirely on isocyanurate formation or entirely on carbondiimide formation. The former pop and burst out in intense heat thus spreading the fire, while the latter melt and flow out to the same end. Foams of low density can be prepared in accordance with this invention whereas foams based entirely on carbodiimide groups can only be prepared at high density and have irregular cell structure. These foams can be sprayed onto the walls of trucks or buildings and have good adhesion thereto compared to the adhension of foams based entirely on isocyanurate formation. Moreover, the foams of this invention are quite amenable to blowing with inert blowing agents whereas the carbodiimide foams are not. Thus, these foams are better insulation per se than the carbodiimide foam. These foams can be foamed in place whereas the pure carbodiimide foams need longer mixing times and will not form foams in place because of the gross amounts of $CO_2$ generated. Furthermore, the water absorption of carbodiimide foams is quite high and outside permissible limits for use in buildings or refrigerated trucks or railroad cars whereas it is within permissible limits when foams are prepared according to the present invention.

The foams of the invention are useful in many places where rigid foams have been used heretofore but they find particular utility in the insulation field where they may be used as insulation for applications that have been heretofore impossible with the known rigid foams. In addition, they may be used for example for the preparation of various decorative articles, for liners for gasoline tanks and the like.

The invention is further illustrated by the following examples in which the parts are by weight unless otherwise indicated.

EXAMPLE 1

To about 100 gms. melted 4,4'-methylene diphenyl diisocyanate at about 50° C. are added 1.1 gms. 1-phenyl 3-methyl 1-phospholene oxide (PMPO) in dry toluene; mixing is continued for about 3 minutes while $CO_2$ is given off. Upon addition of about 4 gms. of 2,4,6-tris-(dimethyl aminomethyl) phenol, the reaction mixture foams with considerable heat evolution, indicating isocyanurate formation. The resulting foam is white, flame resistant, and resilient. It is not brittle like a pure isocyanurate foam. After curing about 1 hour at about 125° C., the foam is still very resilient. The infrared spectrum shows very little free isocyanate, and large amounts of carbodiimide and trimer.

EXAMPLE 2

About 100 gms. of a mixture of polyisocyanates having the formula:

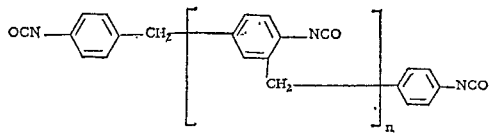

wherein $n$ has an average value of 0.88 and which contains 50 percent diisocyanate an dabout 21 percent triisocyanate, the balance being tetra and pentaisocyanate sufficient to give $n$ a value of 0.88, is heated to about 90° C. and about 0.7 gm. 1-phenyl 3-methyl 1-phospholene oxide (PMPO) in dry toluene is added. This is mixed continuously while $CO_2$ evolves. When about 8 gms. of 2,4,6-tris-(dimethyl aminomethyl) phenol is added to this mixture and mixed for 15 seconds, fine-celled foam is formed without a stabilizer, which is very flame resistant and more rigid than the foam in Example 1, but not brittle. An infrared scan shows little free isocyanate, a small amount of trimer and a large amount of carbodiimide.

EXAMPLE 3

To 100 gms. of

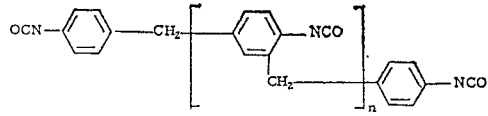

wherein $n$ has an average value of 0.88 and which contains 50% diisocyanate an about 21% triisocyanate, the balance being tetra and pentaisocyanate sufficient to give $n$ a value of 0.88, is added a mixture of about 0.8 gm. 1-phenyl 3-methyl 1-phospholene oxide (PMPO), about 2.1 g. $CH_3OH$ and about 7.1 gms. 2,4,6-tris-(dimethyl aminomethyl) phenol. This is mixed for about 15 seconds. The mixture begins to foam in about 10 seconds, and rises in about 60 seconds. A fine-celled foam is formed which is not brittle.

EXAMPLE 4

About 1465 gms. of

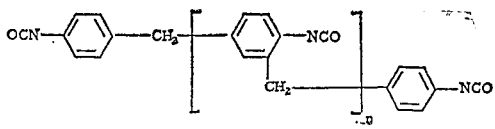

wherein $n$ has an average value of 0.88 and which contains 50% diisocyanate and about 21% triisocyanate, the balance being tetra and pentaisocyanate sufficient to give $n$ a value of 0.88, is heated with about 14 gms. of tris-dichloroethyl phosphates. Analysis of this modified isocyanate shows an isocyanate content of about 22.6%. About 200 gms. of this mixture is combined with 200 gms. of

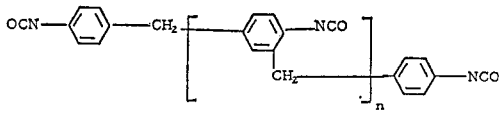

wherein $n$ has an average value of 0.88 and which contains about 50% diisocyanate and about 21% triisocyanate, the balance being tetra and pentaisocyanate sufficient to give $n$ a value of 0.88, about 15 gms. of

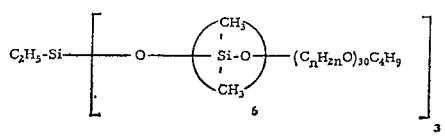

and about 100 gms. of $CFCl_3$. This forms a fine-celled foam within about 40 seconds after the addition of about 38 gms. of 2,4,6-tris-(dimethyl aminomethyl)phenol. This foam is very tough and resilient with no trace of friability or brittleness after one hour at 125° C., and very flame resistant.

EXAMPLE 5

To about 100 parts of a prepolymer prepared by reacting 4,4'-diphenylmethane diisocyanate in the presence of tris(beta-chloroethyl) phosphate to a viscosity of about 17,000 cp. and a free —NCO content of about 20.5% are added 77 parts of an isocyanate having the formula as in Example 2. About 26 parts of trichlorofluoromethane, about 9 parts of 2,4,6-tris(dimethylaminomethyl) phenol, about 2 parts of dipropylene glycol and 2 parts of silicone oil having the formula set forth in Example 4 are mixed on a machine mixer as described in U.S. Reissue Patent 24,514. A rigid foam which has fine cells and is nonbrittle and had a density of about 1.4 pounds per cubic foot is obtained after the foam reacts and sets to a hard brittle mass. This foam has a compression strength of 21 pounds per square inch and when stored at 200° C. for 1 day exhibits a change in volume of only 1.0%. The foam is non-burning, it does not split or crack when subjected to the flame of a propane torch and the time for a propane torch to penetrate a 1 inch thickness of the foam is about 30 minutes. It exhibits a low flame spread factor of only 16.7 when measured by a vertical bar flammability method described at page 157 of "Industrial and Engineering Chemistry," vol. 6, No. 3, September 1967. The foam has 88.5% closed cells. In addition this polymer has exhibited strength as is evidenced from the following TGA data.

| Thermal data (TGA): | Percent wt. loss, 400° C. |
|---|---|
| Carbodiimide/trimer | 5.0 |
| Trimer | 15.0 |
| Urethane/trimer, 50/50 | 3.90 |
| Urethane | 50.0 |

EXAMPLE 6

To about 926 grams of a mixture of 80% 2,4- and 20% 2,6-toluene diisocyanate about 3.0 grams of t-butyl phosphine oxide are added and maintained at 150–160° C. for 2 hours. $CO_2$ is evolved. The resulting product has a viscosity of 450 cps. at 25° C. and contains about 30.5% —NCO.

About 400 grams of this product are mixed with about 100 grams $CFCl_3$, about 4 grams of the silicone oil of Example 3, about 6.0 grams of tripropylene glycol, about 10 grams of 1,3,5-tris(dimethylaminopropyl) hexahydrotriaziine and about 10 grams 2,4,6-tris-(dimethylaminomethyl) phenol for about 10–15 seconds and poured into a cardboard box 12" x 12" x 2". The mixture foams and a rigid cellular material is produced within 4.0 minutes. It has fine cells and a density of 1.9 lbs./ft.³ compression strength at yield is 38.7 p.s.i., and volume expansion at 100° C. for 1 week is 1.27%. The foam is non-burning and non-brittle. Bureau of Mines torch penetration time is 20.0 minutes (procedure reported at page 158 of "Industrial and Engineering Chemistry," vol. 6, No. 3, September 1967).

It is to be understood that the foregoing examples are given for the purpose of illustration and that any other suitable catalyst for carbodiimide formation, catalyst for isocyanurate formation, foam stabilizer or the like could be used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A polycarbodiimide-polyisocyanurate foam.
2. The polycarbodiimide-polyisocyanurate foam of claim 1 wherein from about 3 to about 45% of the total of the carbodiimide and isocyanurate groups in said foam are carbodiimide groups.

3. A method of preparing the polycarbodiimide-polyisocyanurate foam of claim 1 which comprises polymerizing an organic polyisocyanate, in the presence of a blowing agent, a catalyst which promotes the formation of carbodiimide groups and a catalyst which promotes the formation of isocyanurate groups.

4. A method of preparing the polycarbodiimide-polyisocyanurate foam of claim 1 which comprises polymerizing an organic polyisocyanate, in the presence of a blowing agent, a catalyst which promotes the formation of carbodiimide groups in a first step and subsequently polymerizing the resulting prepolymer in the presence of a catalyst which promotes the formation of isocyanurate linkages.

5. A method of preparing the polycarbodiimide-polyisocyanurate foam of claim 1 which comprises polymerizing an organic polyisocyanate simultaneously in the presence of a blowing agent, a catalyst which promotes the formation of carbodiimide groups and a catalyst which promotes the formation of isocyanurate groups.

6. The method of claim 3 wherein said catalyst which promotes the formation of carbodiimide groups is one which will cause the formation of carbodiimide groups at 30° C. or less and said catalyst for the formation of isocyanurate groups is one which will cause gellation of an isocyanate to form an isocyanurate at a temperature of 20° C. in 10 minutes when mixed in an amount of 1 to 10 grams of catalyst per 100 grams of the organic polyisocyanate.

7. The polycarbodiimide polyisocyanurate foam of claim 1 wherein a polyaryl polyalkylene polyisocyanate is polymerized in the presence of a blowing agent, a catalyst which promotes the formation of carbodiimide groups and a catalyst which promotes the formation of isocyanurate groups.

8. The method of claim 4 wherein the polymerization in the first step is stopped when the viscosity of the polymerization mixture is less than 1,000 centipoises at 25° C.

References Cited

UNITED STATES PATENTS

| | | | |
|---|---|---|---|
| 3,144,452 | 8/1964 | Wild et al. | 260—248 |
| 3,180,946 | 4/1965 | Haggis | 260—31.2 |
| 3,206,352 | 9/1965 | Gellis et al. | 161—93 |
| 3,252,942 | 5/1966 | France et al. | 260—77.5 |

FOREIGN PATENTS

| | | | |
|---|---|---|---|
| 851,936 | 10/1960 | Great Britain | 260—77.5 |
| 899,036 | 6/1962 | Great Britain | 260—77.5 |
| 657,835 | 1964 | Belgium | 260—2.5 |
| 702,178 | 1/1965 | Canada | 260—77.5 |
| 908,337 | 10/1962 | Great Britain | 260—2.5 |
| 1,478,759 | 4/1967 | France | 260—2.5 |

DONALD E. CZAJA, Primary Examiner

H. S. COCKERAM, Assistant Examiner

U.S. Cl. X.R.

260—77.5 NC